(12) United States Patent
Rauch

(10) Patent No.: US 6,791,595 B1
(45) Date of Patent: Sep. 14, 2004

(54) BOW ADJUSTMENT IN AN OPTICAL SCANNING SYSTEM BY ADJUSTING THE CURVATURE OF A CYLINDRICAL MIRROR

(75) Inventor: Russell B. Rauch, Pasadena, CA (US)

(73) Assignee: Xerox Corporation, Stamford, CT (US)

( * ) Notice: Subject to any disclaimer, the term of this patent is extended or adjusted under 35 U.S.C. 154(b) by 15 days.

(21) Appl. No.: 10/377,957

(22) Filed: Feb. 27, 2003

(51) Int. Cl.$^7$ .......................... B41J 15/14; B41J 27/00
(52) U.S. Cl. ...................................... 347/242; 347/257
(58) Field of Search ................................ 347/241, 242, 347/256, 257, 234, 244, 248, 258; 359/862, 872, 813

(56) References Cited

U.S. PATENT DOCUMENTS

| | | | |
|---|---|---|---|
| 5,194,993 A | * 3/1993 | Bedzyk | 359/813 |
| 5,210,653 A | 5/1993 | Schell | 359/846 |
| 5,543,829 A | 8/1996 | Fisli | 347/241 |
| 6,219,082 B1 | 4/2001 | Rumsey et al. | 347/242 |

FOREIGN PATENT DOCUMENTS

EP 973055 A2 * 1/2000 ........... G02B/26/12

OTHER PUBLICATIONS

U.S. patent application Ser. No. 09/116,717, Rauch, filed Jul. 16, 1998, Abandoned Case.

* cited by examiner

*Primary Examiner*—Hai Pham
(74) *Attorney, Agent, or Firm*—Oliff & Berridge, PLC

(57) ABSTRACT

A mirror mount adjusts the curvature of a cylindrical mirror along the optical axis of the mirror, typically the wobble correction mirror, to adjust the scanline bow for an optical scanner. By adjusting the curvature in the mirror mount of the cylindrical axis of the mirror in the plane parallel to the mirror, the scanline bows among multiple ROS's can be approximately equalized. A mirror mount has two fixed abutments on the upper edge of the cylindrical mirror and two moveable abutment points along the lower edge of the mirror. The mirror mount adjusts the curvature of the cylindrical mirror vertically for a horizontal beam to adjust the scanline bow for a single beam and approximately equalize the scanline bow for multiple. ROS units in the printing system. During the bow adjustment the cross sectional shape of the cylindrical mirror is naintained so that the cross scan spotsize is maintained during the adjustment.

20 Claims, 12 Drawing Sheets

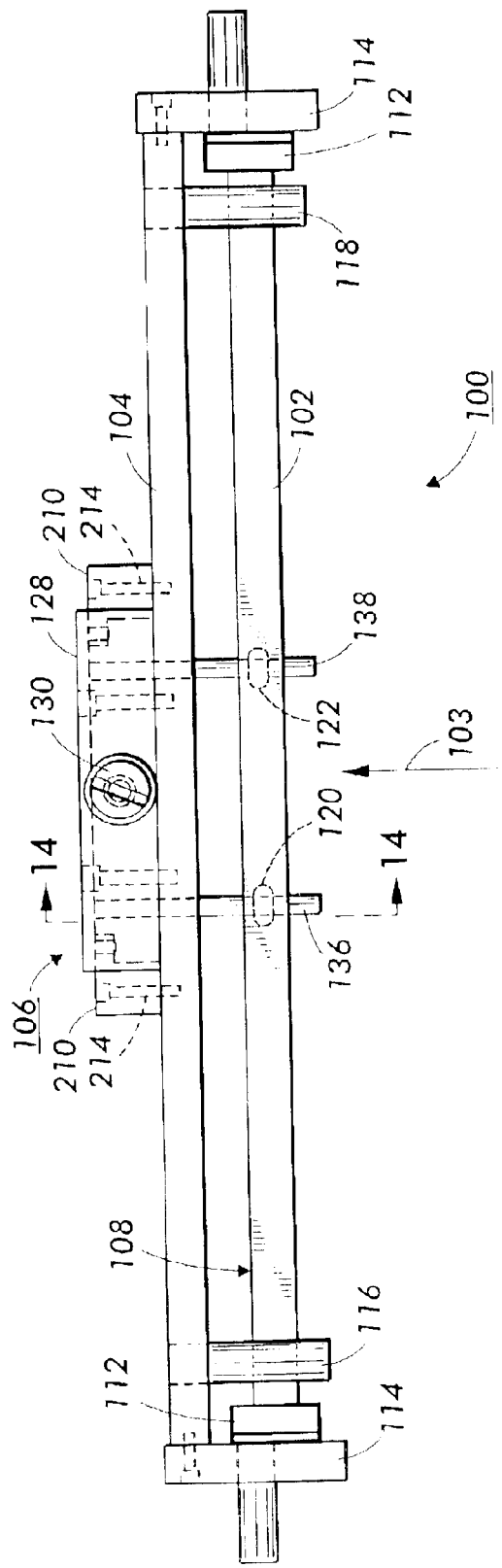

BOW ADJUSTMENT IN AN OPTICAL SCANNING SYSTEM BY ADJUSTING THE CURVATURE OF A CYLINDRICAL MIRROR

BACKGROUND

Present invention is a means of compensating for the unit-to-unit variation of scanline bow in a multiple ROS color printer system by adjusting the scanline bow of each ROS to a common shape and magnitude. More particularly, for adjusting the scanline bow in an optical scanner to approximately equalize the scanline bows in a multiple ROS printing system.

A raster output scanner (or ROS) conventionally has a reflective multi-faceted polygon mirror that is rotated about its central axis to repeatedly scan a single intensity modulated beam across a photosensitive recording medium in the scan direction while the recording medium is being advanced in the cross scan direction. Typically, a laser generates the light beam and a modulator, such as an acousto-optic modulator, modulates the light beam in accordance with the input information to be reproduced on the recording medium. Alternately, the laser can produce a modulated beam directly. Typically in a printing system the laser beam rapidly scans the recording medium while the recording medium is moved orthogonally to the direction of the scanning beam to create a raster scanning pattern. The laser beam scan direction is sometimes referred to as the fast scan direction while the cross scan direction, which is the direction of photoreceptor motion, is sometimes called the slow scan direction Both single beam and multiple beam raster output scanners are particularly useful for high speed printers or multiple color printers. An undesirable character of raster output scanners, however, is scanline bow. For a ROS beam, bow distortions occur from the unavoidable imprecisions in the manufacture and mounting of the lenses and mirrors of the optical elements of the ROS. Scanline bow arises from the very nature of optical scanning systems, where the beam is offset in the cross-scan direction from the ideal horizontal straight line in the scan direction of the scan line on the recording medium. For example an optical aberration such as distortion that varies as the beam scans through different parts of the f-theta lens system can cause scanline bow.

Depending upon the accumulation of optical tolerances, the bow may bend in the middle of the scan line about a central mid-point in either cross-scan direction. A bow where the central mid-point is higher than the rest of the scan line is called a "frown" while a bow where the central mid-point is lower than the rest of the scan line is called a "smile".

As best seen in the force diagram of FIG. 1, the bending device 106 of the mirror mount is located around a center portion of the wobble correction mirror 102 (i.e., the area near the center point CP). Thus, when the setting screw is appropriately adjusted, the bending device 106 applies a force through the two moveable lower abutments to the bottom edge of the mirror 102. These two abutments serve as load points and are symmetrically located about the vertical axis and because of the single set screw apply equal force to the mirror. The top edge of the mirror is restrained by the two fixed upper abutments 116 and 118 along the outer edges of the upper edge. These two abutments serve as fulcrums and are symmetrically located about the vertical axis to apply equal force to the mirror. The moveable load points are much closer to the center of the wobble correction mirror than the stationary fixed fulcrums.

The force applied to the bottom middle edge of the mirror causes the mirror to be bent upward in the vertical axis and results in a local displacment of the optical axis of the wobble mirror in the direction parallel to the optical face and perpendicular to the optical axis of 102 due to this bending of the optical axis, as shown in FIG. 2. That is, the position of the center point CP will move a certain distance vertically out of the plane defined by the horizontal ends of the mirror, to create a "bow" or "bend" in the mirror 102 without deforming the cross sectional shape of the mirror so that the cylindrical focus of the mirror is not changed during adjustment. Typical mirrors 102 are capable of easily being adjusted in sag by up to 2 mm, depending on the width and the length of the mirror. However, movements of only a fraction of a millimeter are sufficient to correct for scanline bow problems.

Moreover, the magnitude of the scanline bow varies from one optical scanner to another optical scanner. Therefore in a printer with multiple optical scanners, such as a single pass color printer, there can be significant overlay mis-registration of the raster images for the various colors as in FIG. 1 due to differing amounts of bow for the raster image of the different raster scanners.

It is the object of present invention to adjust the bow of each scanner to a common shape so that the raster images from the various scanners in the system will have minimal color overlay mis-registration in the slow scan direction as in FIG. 6.

The prior art has utilized bow adjusters with a different principle from the present invention. In U.S. Pat. No. 5,543,829 by Fisli a mirror is deformed normal to the optical face. This bending of the mirror face causes an incident scanning beam that is reflected from the mirror to be locally translated parallel (relative to the reflected beam from the undeformed mirror). Rumsey et al in U.S. Pat. No. 6,219,082 also bend the mirror normal to the mirror optical face. Another invention that bends a mirror normal to the optical face with mechanical adjusters is U.S. Pat. No. 5,210,653 by Schell and uses a multitude of adjusters to change the surface figure of a mirror.

The present invention utilizes a cylindrical mirror and more particularly the wobble correction mirror to correct the scanline bow of a raster scanning system. It differs from the prior art by 1) adjusting the cylindrical mirror in a direction parallel to the mirror face and perpendicular to the optical axis of the mirror. 2) The mirror must be a cylindrical mirror cannot be a planar mirror as in the Fisli and Rumsey patents. Additionally the present invention closely maintains the cylindrical curvature of the mirror during deformation so that cross scan spot size is not adversely changed during bow adjustment.

FIG. 1 shows a schematic of the wobble correction mirror 102 being deformed parallel to the optical face by forces applied to the bottom edge of the cylindrical mirror at 120 and 122. Two abutments 116 and 118 at the top edge of the cylindrical mirror provide a counter-force so that the mirror will bend in flexure. It can be shown by calculation and by actual measurement that the deformed shape of the mirror along its length is a parabola.

Cross section of the cylindrical mirror in a region between the fixed abutments is schematically illustrated in FIG. 2. The cross section of the mirror before adjustment is illustrated 102 by the solid line and the cross section of the mirror after adjustment by 102. The movement of the mirror cross section is actually displaced parallel to to the mirror face by the present invention and is only shown slightly displaced in the normal direction to more clearly see the outline of the mirror before and after displacement. In the present invention the incident beam 203 is reflected by the undeformed wobble mirror as a reflected beam 205. After the wobble mirror cross element is deformed to position 102, the reflected ray is rotated through a small angle relative to 205 and becomes beam 207. It can be shown by calculation and by experiment that the angular rotation of beam upon displacement of the mirror cross section is proportional to the amount of displacement for small displacements. Moreover the amount of change of the scanline bow is jointly proportional to both the rotation angle and the distance from the wobble mirror and this product is the change in scanline bow at the photoreceptor plane produced by bending the wobble correction mirror parallel to the optical face.

SUMMARY

In accordance with the present invention, a mirror mount adjusts the curvature of a cylindrical mirror along the optical axis of the mirror, typically the wobble correction mirror, to adjust the scanline bow for an optical scanner. By adjusting the curvature in the mirror mount of the cylindrical axis of the mirror in the plane parallel to the mirror, the scanline bows among multiple ROS's can be approximately equalized. A mirror mount has two fixed abutments on the upper edge of the cylindrical mirror and two moveable abutment points along the lower edge of the mirror. The mirror mount adjusts the curvature of the cylindrical mirror vertically for a horizontal beam to adjust the scanline bow for a single beam and approximately equalize the scanline bow for multiple. ROS units in the printing system. During the bow adjustment the cross sectional shape of the cylindrical mirror is maintained so that the cross scan spotsize is maintained during the adjustment.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 11 is a top perspective view of the mechanism shown in FIG. 9.

DESCRIPTION OF THE DRAWINGS

Figure 3:
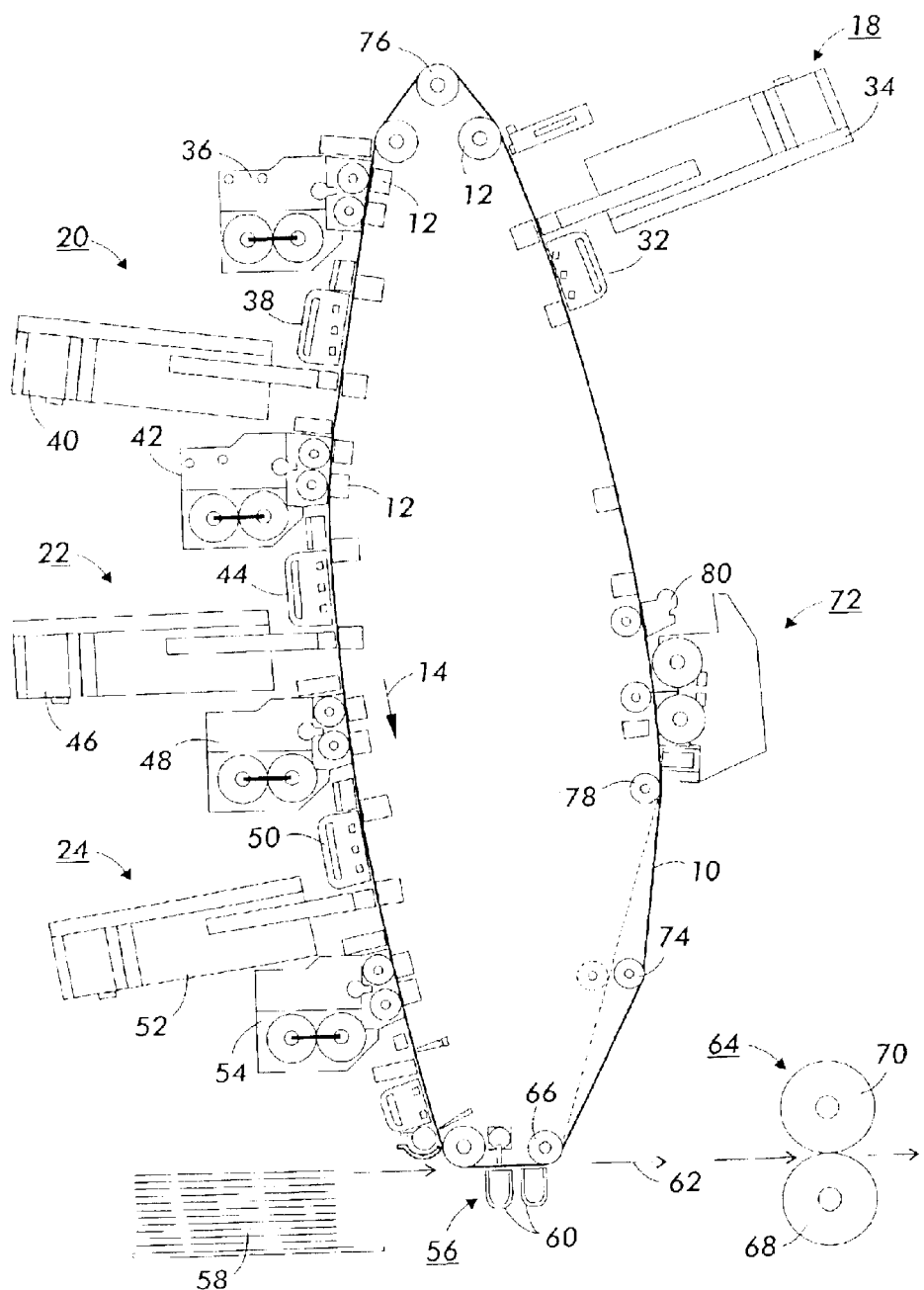
FIG. 3 is a schematic side view of a single pass multiple raster output scanning (ROS) color printing system.

Referring now to the drawing, there is shown in FIG. 3 a single pass multi-color printing machine. This printing machine employs a photoconductive belt 10, supported by a plurality of rollers or bars, 12. Photoconductive belt 10 is arranged in a vertical orientation. Belt 10 advances in the direction of arrow 14 to move successive portions of the external surface of photoconductive belt 10 sequentially beneath the various processing stations disposed about the path of movement thereof. The printing machine architecture includes four image recording stations indicated generally by the reference numerals 18, 20, 22, and 24, respectively. Initially, belt 10 passes through image recording station 18. Image recording station 18 includes a charging device and an exposure device. The charging device includes including a corona generator 32 that charges the exterior surface of photoconductive belt 10 to a relatively high, substantially uniform potential. After the exterior surface of photoconductive belt 10 is charged, the charged portion thereof advances to the exposure device. The exposure device includes a raster output scanner (ROS) 34, which illuminates the charged portion of the exterior surface of photoconductive belt 10 to record a first electrostatic latent image thereon. Alternatively, a light emitting diode (LED) may be used.

This first electrostatic latent image is developed by developer unit 36. Developer unit 36 deposits toner particles of cyan on the first electrostatic latent image. After the highlight toner image has been developed on the exterior surface of photoconductive belt 10, belt 10 continues to advance in the direction of arrow 14 to image recording station 20.

Image recording station 20 includes a recharging device and an exposure device. The charging device includes a corona generator 38 which recharges the exterior surface of photoconductive belt 10 to a relatively high, substantially uniform potential. The exposure device includes a ROS 40 which illuminates the charged portion of the exterior surface of photoconductive belt 10 selectively to record a second electrostatic latent image thereon. This second electrostatic latent image corresponds to the regions to be developed with magenta toner particles. This second electrostatic latent image is now advanced to the next successive developer unit 42. Developer unit 42 deposits magenta toner particles on the electrostatic latent image. In this way, a magenta toner powder image is formed on the exterior surface of photoconductive belt 10. After the magenta toner powder image has been developed on the exterior surface of photoconductive belt 10, photoconductive belt 10 continues to advance in the direction of arrow 14 to image recording station 22.

Image recording station 22 includes a charging device and an exposure device. The charging device includes corona generator 44, which recharges the photoconductive surface to a relatively high, substantially uniform potential. The exposure device includes ROS 46 which illuminates the charged portion of the exterior surface of photoconductive belt 10 to selectively dissipate the charge thereon to record a third electrostatic latent image corresponding to the regions to be developed with yellow toner particles. This third electrostatic latent image is now advanced to the next successive developer unit 48. Developer unit 48 deposits yellow toner particles on the exterior surface of photoconductive belt 10 to form a yellow toner powder image thereon. After the third electrostatic latent image has been developed with yellow toner, belt 10 advances in the direction of arrow 14 to the next image recording station 24.

Image recording station 24 includes a charging device and an exposure device. The charging device includes a corona generator 50, which charges the exterior surface of photoconductive belt 10 to a relatively high, substantially uniform potential. The exposure device includes ROS 52, which illuminates the charged portion of the exterior surface of photoconductive belt 10 to selectively dissipate the charge on the exterior surface of photoconductive belt 10 to record a fourth electrostatic latent image for development with cyan toner particles. After the fourth electrostatic latent image is recorded on the exterior surface of photoconductive belt 10, photoconductive belt 10 advances this electrostatic latent image to the magenta developer unit 48. Cyan developer unit 48 deposits magenta toner particles on the fourth electrostatic latent image. These toner particles may be partially in superimposed registration with the previously formed yellow powder image. After the cyan toner powder image is formed on the exterior surface of photoconductive belt 10, photoconductive belt 10 advances to the next image recording station 24.

Image recording station 24 includes a charging device and an exposure device. The charging device includes corona generator 50 which charges the exterior surface of photoconductive belt 10 to a relatively high, substantially uniform potential. The exposure device includes ROS 52, which illuminates the charged portion of the exterior surface of photoconductive belt 10 to selectively discharge those portions of the charged exterior surface of photoconductive belt 10 which are to be developed with black toner particles. The fourth electrostatic latent image, to be developed with black toner particles, is advanced to black developer unit 54. In practice the sequence of depositing the colors may be different than the sequence illustrated here.

At black developer unit 54, black toner particles are deposited on the exterior surface of photoconductive belt 10. These black toner particles form a black toner powder image which may be partially or totally in superimposed registration with the previously formed, cyan, magenta, and yellow toner powder images. In this way, a multi-color toner powder image is formed on the exterior surface of photoconductive belt 10 Thereafter, photoconductive belt 10 advances the multi-color toner powder image to a transfer station, indicated generally by the reference numeral 56.

At transfer station 56, a receiving medium, i.e., paper, is advanced from stack 58 by sheet feeders and guided to transfer station 56. At transfer station 56, a corona generating device 60 sprays ions onto the back side of the paper. This attracts the developed multi-color toner image from the exterior surface of photoconductive belt 10 to the sheet of paper. Stripping assist roller 66 contacts the interior surface of photoconductive belt 10 and provides a sufficiently sharp bend thereat so that the beam strength of the advancing paper strips from photoconductive belt 10. A vacuum transport moves the sheet of paper in the direction of arrow 62 to fusing station 64.

Fusing station 64 includes a heated fuser roller 70 and a back-up roller 68. The back-up roller 68 is resiliently urged into engagement with the fuser roller 70 to form a nip through which the sheet of paper passes. In the fusing operation, the toner particles coalesce with one another and bond to the sheet in image configuration, forming a multi-color image thereon. After fusing, the finished sheet is discharged to a finishing station where the sheets are compiled and formed into sets which may be bound to one another. These sets are then advanced to a catch tray for subsequent removal therefrom by the printing machine operator.

One skilled in the art will appreciate that while the multi-color developed image has been disclosed as being transferred to paper, it may be transferred to an intermediate member, such as a belt or drum, and then subsequently transferred and fused to the paper. Furthermore, while toner powder images and toner particles have been disclosed herein, one skilled in the art will appreciate that a liquid developer material employing toner particles in a liquid carrier may also be used. Invariably, after the multi-color toner powder image has been transferred to the sheet of paper, residual toner particles remain adhering to the exterior surface of photoconductive belt 10. The photoconductive belt 10 moves over isolation roller 78 which isolates the cleaning operation at cleaning station 72. At cleaning station 72, the residual toner particles are removed from photoconductive belt 10. The belt 10 then moves under spots blade 80 to also remove toner particles therefrom.

Figure 4:
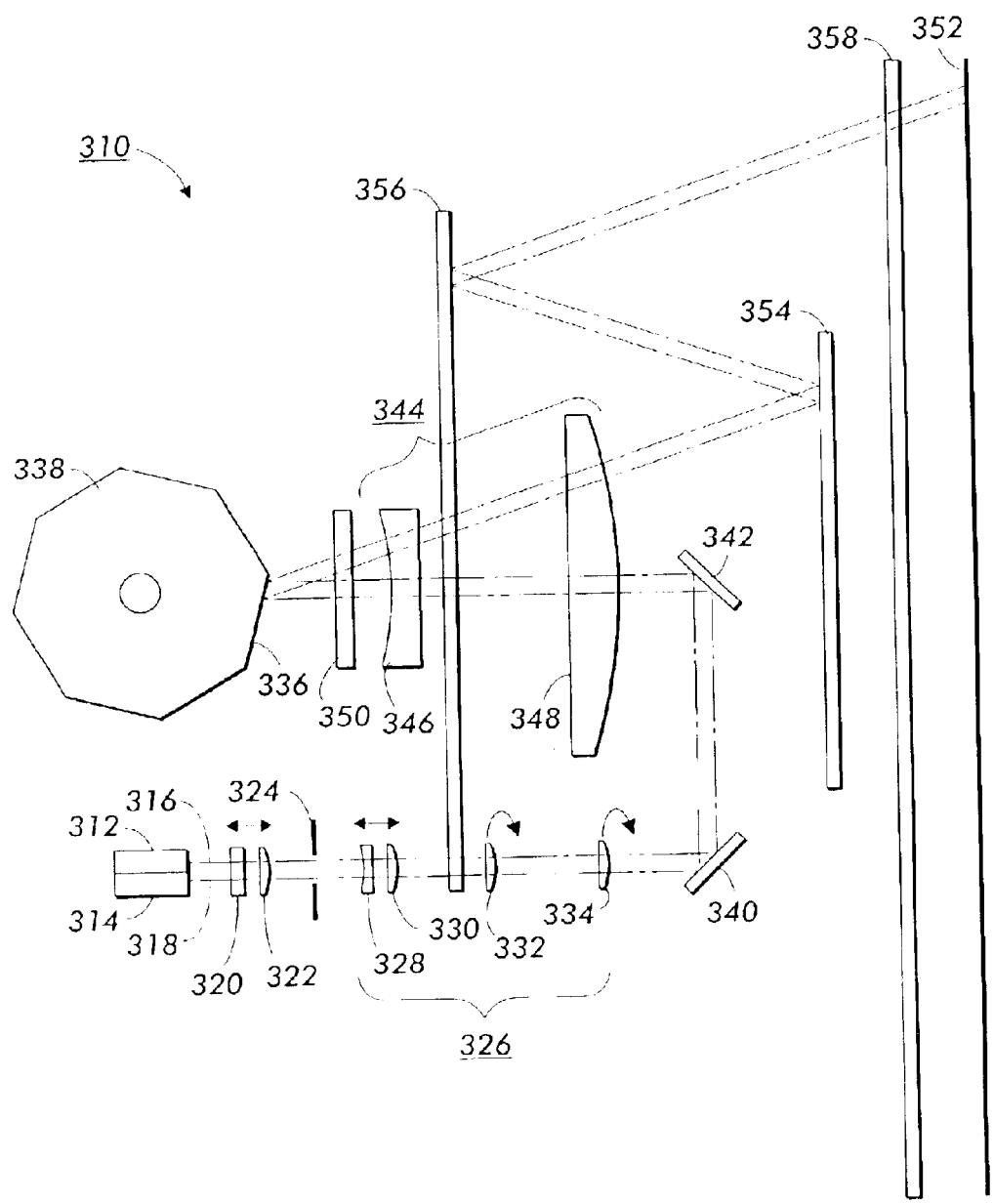
FIG. 4 is a schematic perspective view of a single raster output scanning (ROS) system.
Figure 5:
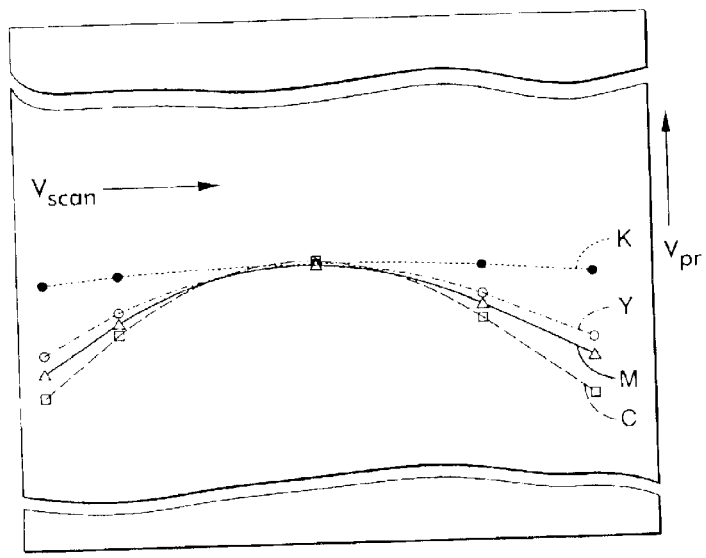
FIG. 5 graphically illustrates the color overlay-registration degradation when the bow of the ROS units in the system has unit to unit variation.

Turning now to FIG. 4 there is illustrated a single raster output scanning (ROS) system. The design specifications for the preferred optical system 310 require a resolution of 600 pixels per inch, over a scan line of 12.2 inches (310 mm). A pair of laser diodes 312 and 314 emit a pair of modulated light beams 316 and 318 in the infrared wavelength range of 780 nanometers. The dual diodes are separated by a distance of approximately 25 $\mu$m, and are oriented in the optical system so that they are offset in the cross scan direction. The light beams 316 and 318 pass through a flat FK5 Schott glass window 320 of the laser diodes 312 and 314. The dual beams 316 and 318 are next collimated by a piano-convex aspherical SF8 Schott lens 322.

Once transmitted through the aspherical collimating lens 322, the dual beams are then passed through an aperture or rectangular stop 324, where a portion of each beam's intensity may be attenuated. The aperture 324 controls the F/#, which in turn controls the spot size created by the dual beams. The major axis of the rectangle is in the scan plane and the minor axis of the rectangle is in the cross-scan plane. The collimator lens can be moved laterally in the optical path of the dual beams to allow maximum optical throughput through the aperture.

Light beams 316 and 318 are then focused by a four element cylindrical lens group 326. Cylindrical lens group 326 consists of a first concave-plano BK7 Schott lens 328, a second plano-convex BK7 Schott lens 330, a third cylindrical piano-convex BK7 Schott lens 332 and a fourth cylindrical plano-convex BK7 Schott lens 334. The focal length and position of the cylinder lens group 326 focuses the dual beams in the cross scan plane at the overfilled facet 336 of the rotating polygon mirror 338. The dual beams remain collimated by the cylinder lens group 326 in the scan plane at the facet 336.

The first two lenses 328 and 330 of the four lens element cylindrical lens group 326 can be moved together laterally along the optical path for optimum tangential focus correction of the dual beams. The third lens 332 of the four lens element cylindrical lens group 326 can be independently rotated for optimum sagittal focus correction and beam separation compensation of the dual beams. The fourth lens 334 of the four lens element cylindrical lens group 326 can be independently rotated for optimum sagittal focus correction and beam separation compensation of the dual beams.

Having been focussed in the cross scan plane by cylinder lens group 326, the dual beams are the reflected off the planar surface of the first folding mirror 340, and are then reflected off the planar surface of the second folding mirror 342, in the direction of the facet 336. After the two reflections, the dual beams are transmitted through the two element f-theta lens group 344. The f-theta lens group consists of a first cylindrical concave-piano F2 Schott scan lens 346 and a second cylindrical plano-convex SF10 Schott scan lens 348. After reflection from the second fold mirror 342, the dual beams will traverse the second f-theta scan lens 348 first from the convex side and then the first f-theta scan lens 346 from the piano side. The dual beams are then transmitted through a flat BK7 Schott glass window 350 to overfill the facet 336 of the rotating polygon mirror 338. The window 350 serves to eliminate air turbulence and contamination by foreign objects caused by the rotating polygon mirror from effecting the other optical elements of the ROS system 310.

The dual beams 316 and 318 are reflected by the overfilled facet 336. The rotation of the polygon facet surface causes the dual beams to be scanned across the photoreceptor surface 352. The dual beams 316 and 318 then pass back through the flat window 350 and then the f-theta lens group 344 a second time, in the opposite direction, in a double pass. Light beams 316 and 318 are then focussed and linearized by the two element f-theta lens group 344 as the beams are transmitted, in sequence, through the first cylindrical concave-piano F2 Schott scan lens 346 and the second cylindrical piano-convex SF10 Schott scan lens 348.

The post-polygon f-theta lens group 344 is designed to provide a linear relationship between the rotation of the polygon mirror 338 and the deflection of the scanned beams 316 and 318 in the scan direction at the photoreceptor surface 352. The photoreceptor 352 moves in a process direction. The main function of the f-theta lens group is to control the scan linearity, in terms of uniform spot displacement per unit angle of polygon rotation. After the f-theta lens group 344, the dual beams 316 and 318 are reflected by the planar surface of a third folding mirror 354, and then reflected by a cylindrical wobble correction mirror 56, prior to passing through a flat BK7 Schott glass exit window 358. The exit window 358 isolates the ROS system 310 from the remainder of the xerographic engine, keeping ink, grease, dirt and other foreign objects out of the ROS optical elements.

After passing through exit window 358, the dual beams 316 and 318 impinge upon the surface of photoreceptor 352 forming two spots. The two spots each produce a scan line of at least 12 inches (i.e., at least a page width) when scanned across the photoreceptor surface 352 by the rotating polygon mirror 338. The f-theta scan lens group 344 and the cylindrical wobble correction mirror 356 focus the collimated reflected light beams 316 and 318 in the fast scan direction onto the image plane of the photoreceptor surface 352, and re-image the light focused on the facet 336 in the cross scan direction, onto the image plane of the photoreceptor surface 352. The mirror 356 provides wobble correction or motion compensating optics for the dual beams.

Figure 6:
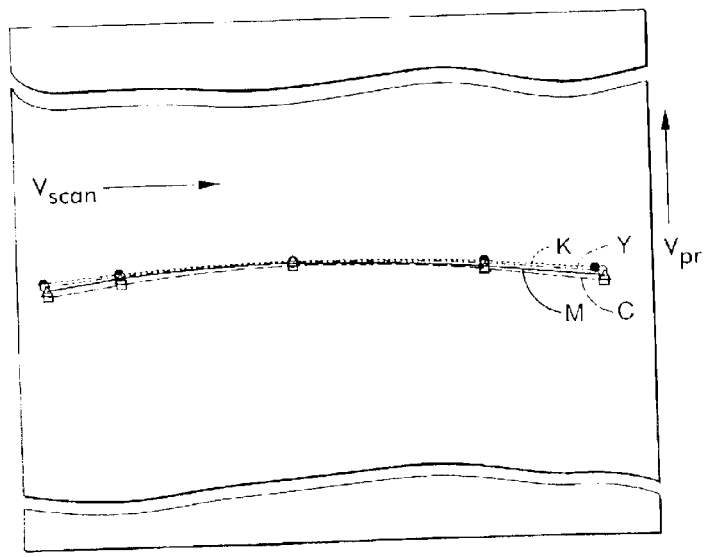
FIG. 6 graphically illustrates how improved bow matching improves the color-overlay registration.
Figure 7:
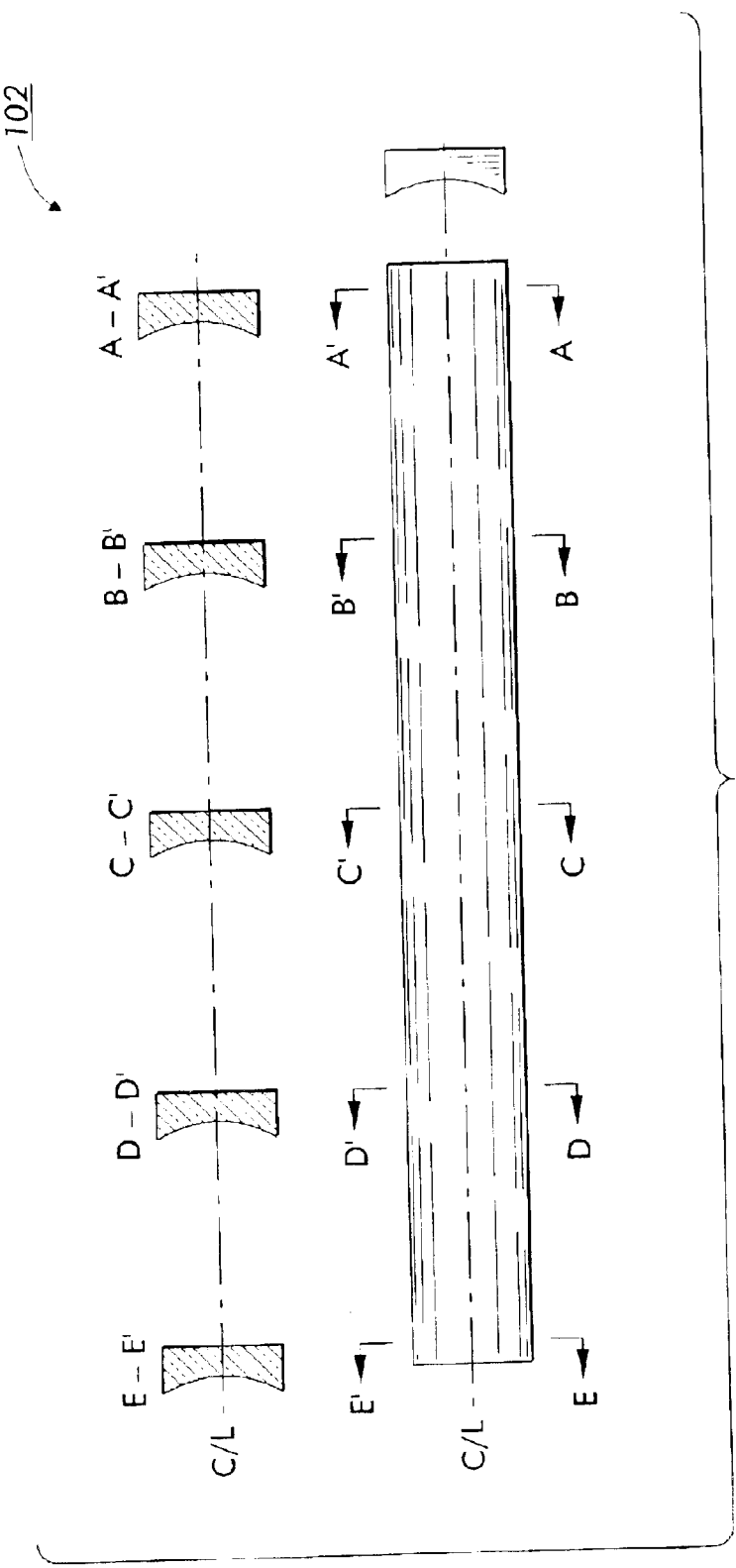
FIG. 7 illustrates the wobble correction mirror before deforming for bow adjustment.
Figure 8:
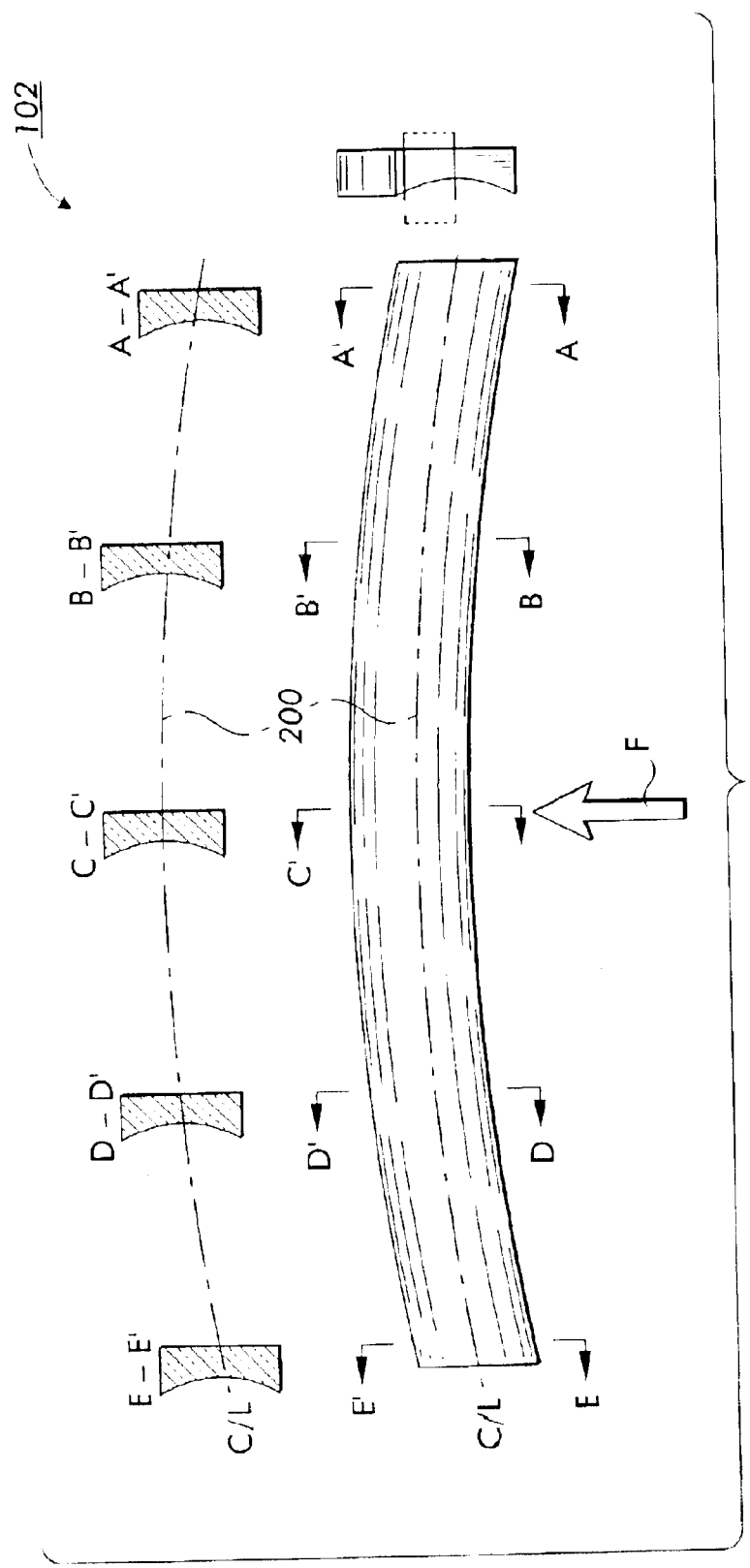
FIG. 8 illustrates that the deformation of the mirror shown in FIG. 7 to locally cause a rotation of the laser beam as in FIG. 2.
Figure 9:
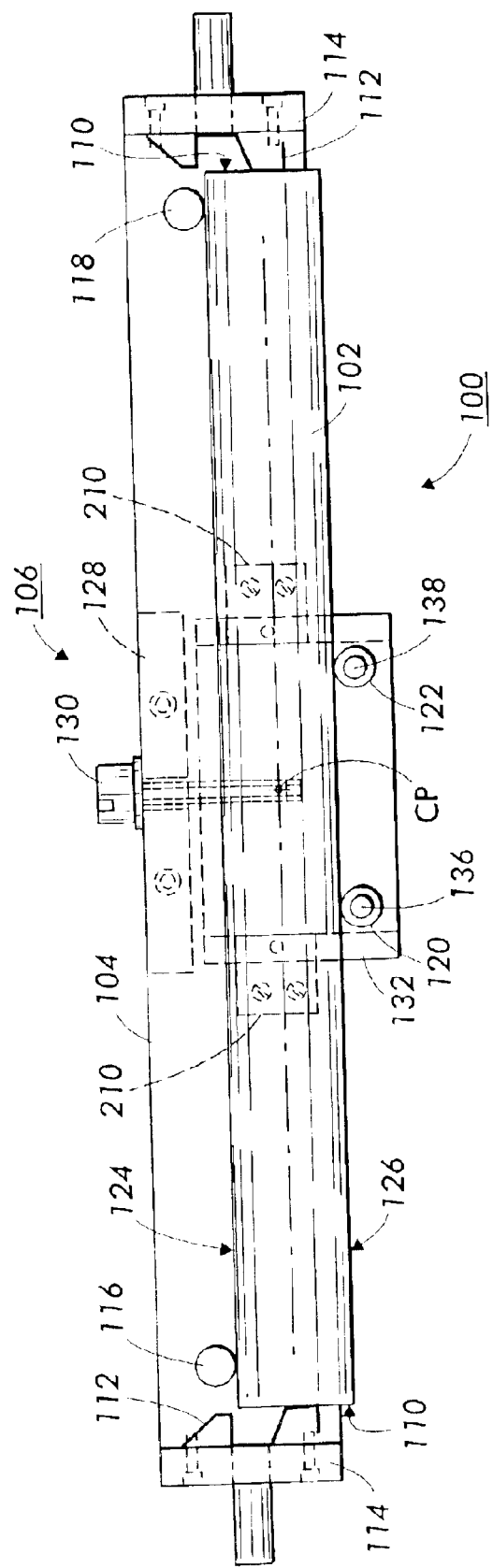
FIG. 9 is a front perspective view of a mechanism for adjusting the deformation of the wobble correction mirror parallel to the mirror face.

FIG. 7 illustrates the wobble mirror and various cross sections before bow adjustment and FIG. 8 shows the wobble mirror and various cross sections after bow adjustment. FIG. 9 is a front view of bow adjustment means 106 in the present invention that is used to bend the wobble correction mirror 102 in the manner proscribed above by FIG. 8. In this view the wobble mirror 102 is seen to rest against fixed pins 116 and 118. Two pins 120 and 122 are carried by a crossbar 132 and apply an upward force against the bottom side of the wobble mirror 102. FIG. 6 is a back view of the bow adjustment means 106 and the backing plate 104. The crossbar 132 has a threaded hole 212 to receive an adjustment screw 130, which passes through a clearance hole in an anchor bar 128 that is mounted to the backing plate 104. Two guide plates 210 are used to confine the crossbar to a plane that is parallel to the backing plate and to the optical face of the wobble mirror. Upon turning the adjustment screw the mirror is deformed as in FIG. 8 and the bow is thereby adjusted. Optional end caps 114 with integral cylindrical pins can be used to mount the backing plate to the scanner system although other mounting means can be used.

Figure 1:
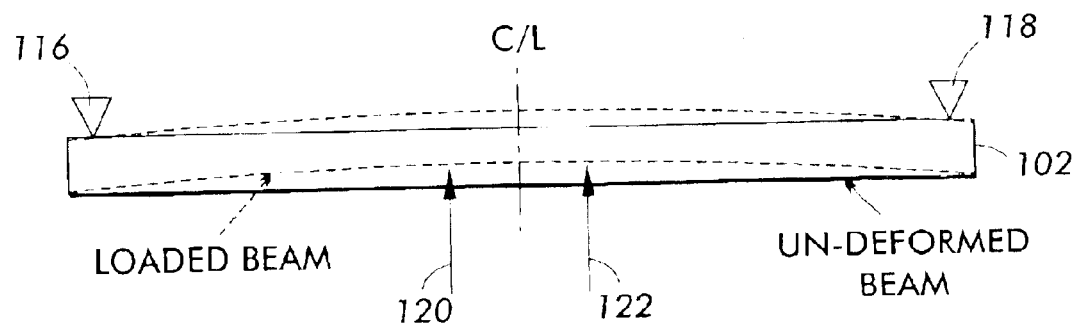
FIG. 1 is a diagram showing the forces applied to the mirror by the mirror mount according to the present invention.
Figure 2:
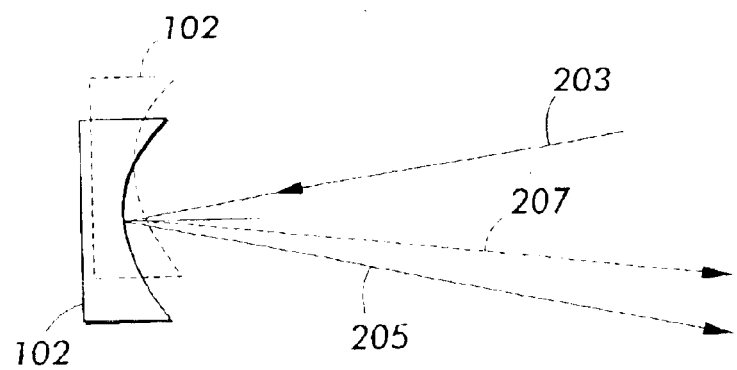
FIG. 2 is a cross-sectional side view of the vertical displacement of the mirror resulting from the mirror mount formed according to the present invention.

Reference is now made to FIGS. 9 through 14 illustrating a mirror mount 100 and its components for adjusting the curvature of a cylindrical mirror 102 in accordance with this invention. The cylindrical mirror 102 is typically the wobble correction mirror in the ROS. A light beam 103 will strike and be reflected from the cylindrical mirror horizontally as shown in the FIG. 2.

Figure 10:
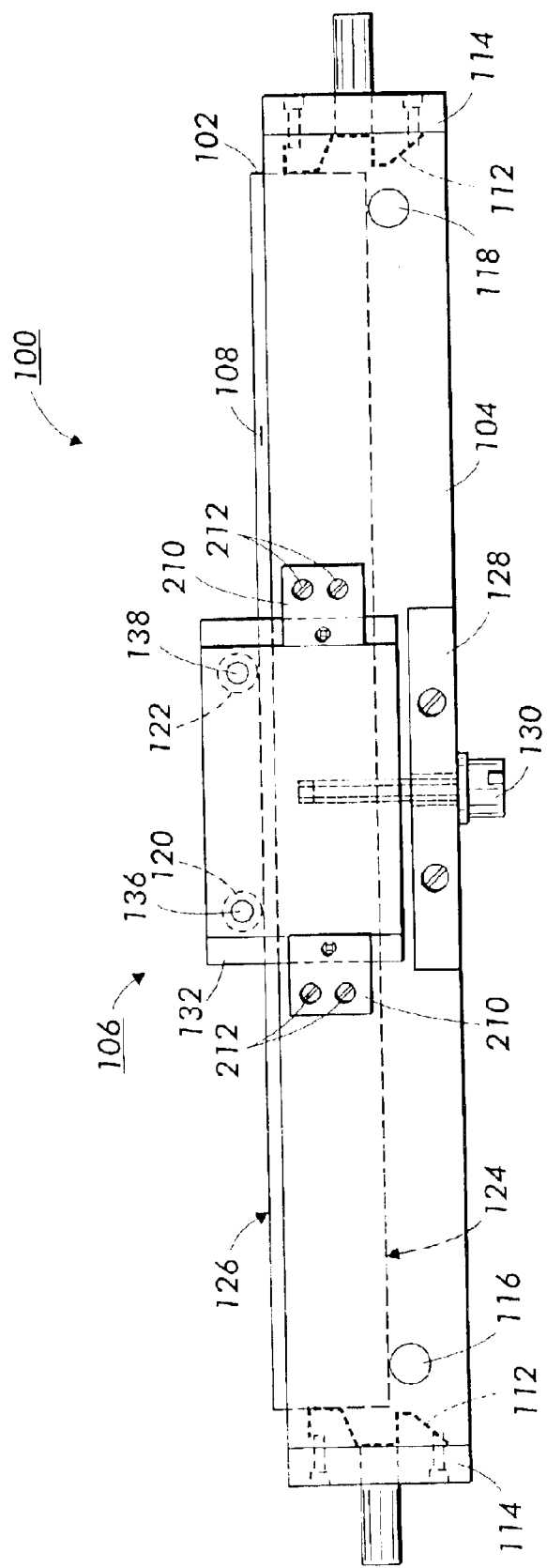
FIG. 10 is a back perspective view of the mechanism shown in FIG. 9.

As shown in front back and top views, FIGS. 9, 10 and 11 respectively, the mirror mount 100 includes a backing plate 104 and a bending device 106 positioned at a center location of the mirror 102 along the rear surface 108 of the mirror 102 behind the mirror and between the horizontal ends 110 of the mirror. The mirror is flexibly secured at the horizontal ends 110 to the backing plate 104 by springs 112 attached to end crossbar clamps 114. The mirror is secured at the horizontal ends to avoid translation along the long axis of the mirror but is capable of bending along its vertical axis, the amount of the bending being adjusted by the bending device along the center of the mirror before adjustment.

The bending device 106 contacts and holds the mirror 102 preferably using abutments 116, 118, 120 and 122. The rear surface 108 of the mirror 102 has a central horizontal axis and a central vertical axis which intersect at a center point CP of the mirror 102. The two upper abutments 116 and 118 preferably contact the upper horizontal edge 124 of the mirror 102, equally spaced from the center point CP, on the same side of the horizontal axis but different sides of the vertical axis on the outer edge of the mirror. The two upper abutments 116 and 118 are connected to the hacking plate 104. The two upper abutments are fixed in position.

The two lower abutments 116 and 118 preferably contact the lower horizontal edge 126 of the mirror 102, equally spaced from the center point CP, on the same side of the horizontal axis but different sides of the vertical axis on the inner edge of the mirror. The two lower abutments are moveable in position.

The two upper abutments are on opposite sides of the mirror and its horizontal axis from the two lower abutments. The two upper abutments are spaced farther along the edge of the mirror than the lower abutments which are closer to the center point CP and the vertical axis. The four abutments contact the mirror along the upper horizontal edge and the lower horizontal edge. Other embodiments of the abutments are also within the scope of this invention.

The backing plate 104 is between the bending device 106 and the rear surface 108 of the mirror 102. The hacking plate extends along the full rear surface of the mirror while the bending device is located around a center portion of the rear surface of the mirror. The bending device is preferably secured to the backing plate and allows movement of the bending device and the mirror relative to the backing plate.

The bending device is parallel and alongside the backing plate. A fixed bar 128 extends from the backing plate 104 above the bending device 106. The mirror mount 100 includes a setting screw 130 that is aligned with the vertical axis and the center point CP and extends through the fixed bar 128 of the backing plate 104 to a moveable cross-bar 132 of the bending device. The screw 130 is passes through a clearance hole 134 of the fixed bar 128 into a threaded hole of the cross-bar 132. A washer 131 can be placed between the screw 130 and the fixed bar 128.

The cross-bar 132 is connected to lateral pins 136 and 138 which extend under the mirror 102. The pins 136 and 138 are parallel to the bottom surface 126 of the mirror 102. The lower abutment 120 extends from the lateral pin 136 to contact the lower horizontal edge 126 of the mirror 102. The lower abutment 122 extends from the lateral pin 138 to contact the lower horizontal edge 126 of the mirror 102.

Different angular rotations of the setting screw 130 cause the cross-bar 132 to move vertically in one direction which causes the lateral pins 136 and 138 to move and thus the two lower abutments 120 and 122 to move vertically in the direction of the cross-bar movement. The setting screw and thus the abutments can move in both directions, up and down, vertically. Thus, scanline bow can be corrected by introducing a compensating scanline bow within the mirror 102 of the raster output scanning system using the above-described apparatus and method. As shown in the graph of FIG. 15, the actual scanline bows of a beam (for various amounts of adjustment) remain parabolic and closely matched over the entire scanline after adjustment of scanline bow by the mirror mount formed according to the present invention.

Figure 12A:
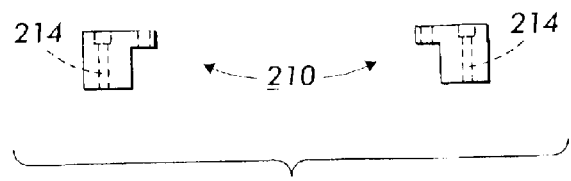
FIGS. 12A and 12B are detail top views of the guide plates and yokes shown for use in the mechanism shown in FIGS. 9, 10 and 11.
Figure 12B:
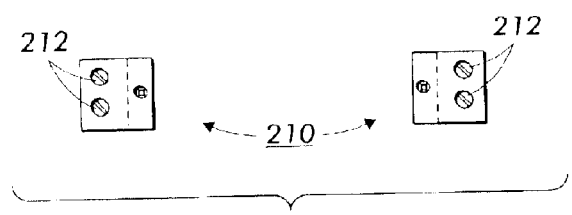
Figure 13A:
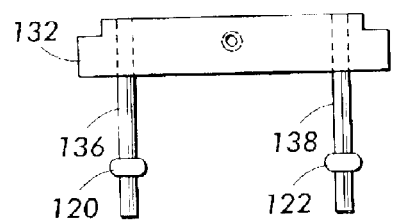
FIGS. 13A and 13B are detail top and side perspective views of the guide plates and yokes shown for use in the mechanism of shown in FIGS. 9, 10 and 11.
Figure 13B:
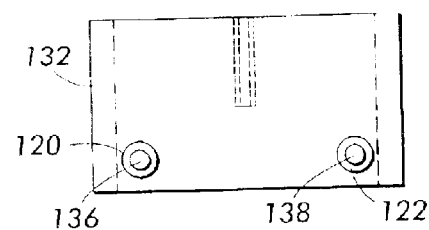
Figure 14:
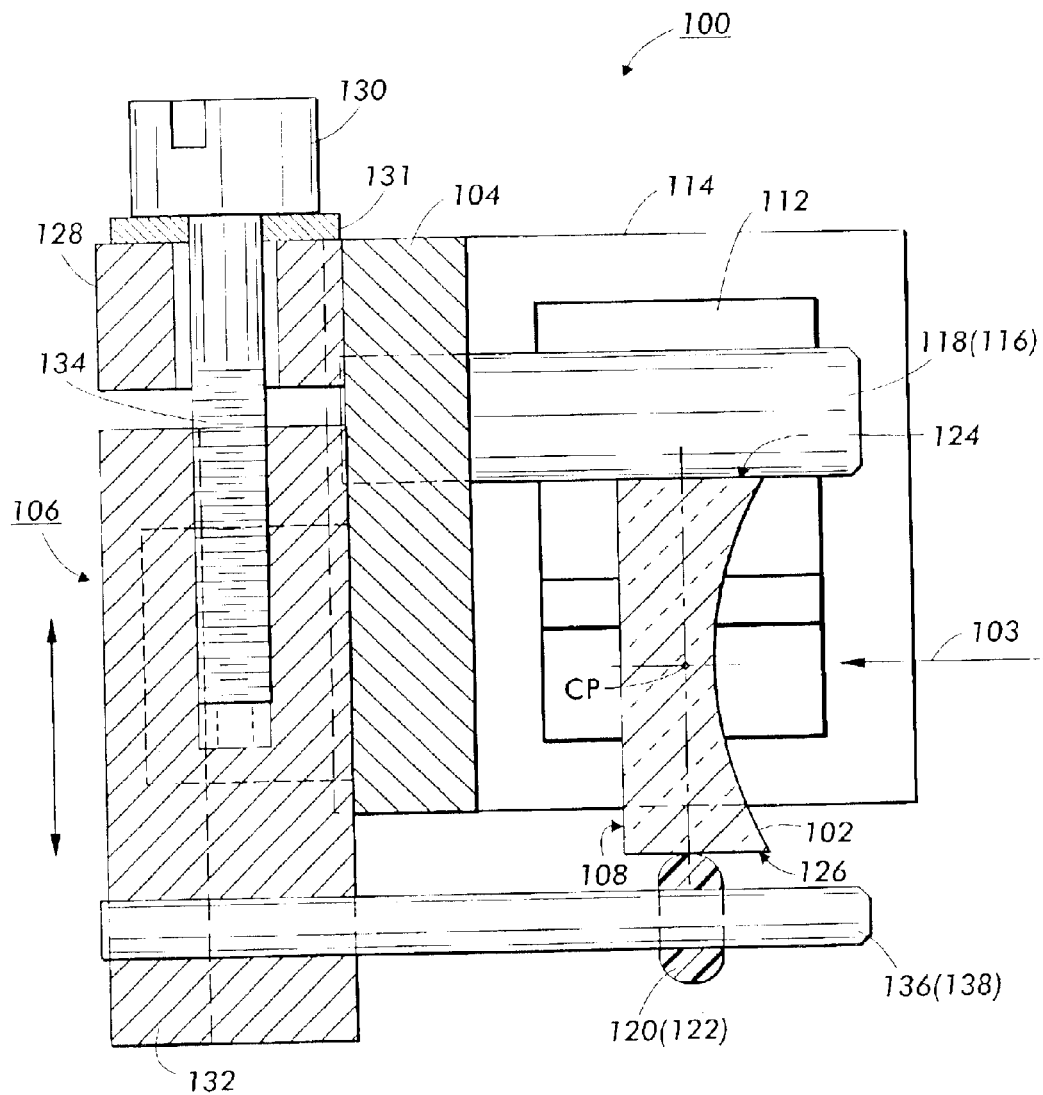
FIG. 14 is a cross-sectional side view of the mirror mount for adjusting the curvature of a cylindrical mirror.

FIGS. 12A and 12B illustrate the details of the crossbar guideplates 210 in a top view and back view respectively. These guide plates are mounted to the backing plate and have mounting screws 212 to attach guides 210 to the backing plate 104 and set screws 214 therein to allow locking the crossbar in place after bow adjusment has been made. FIGS. 13A and 13B are top and side views of the crossbar showing details of the pins that rendered moveable by the crossbar. There are torroidal rings 120 and 122 mounted to pins 136 and 138. These torroidal rings enable the force to be applied at the bottom of the wobble mirror so that the force is centered between the optical face of the mirror and the back face 108 of the wobble mirror 102 as illustrated in FIG. 14, which is a cross sectional view of the bow adjustment means 106. By centering the upward force on the side of the wobble mirror, localized twisting of the mirror face about the long axis of the mirror is minimized so that the bow curve is not locally distorted from the desired parabolic shape by a twisting moment about the long axis of the wobble mirror.

Figure 15:
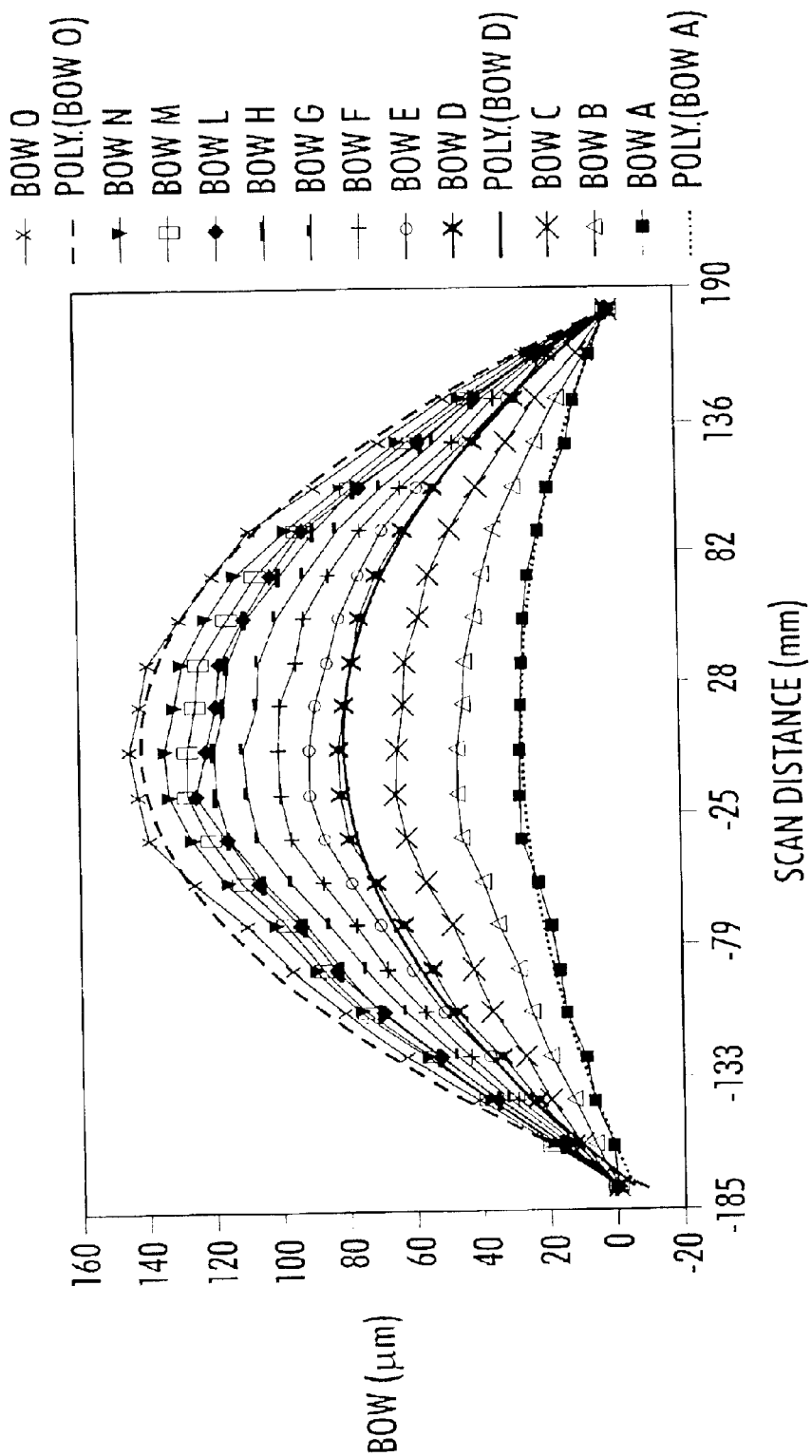
FIG. 15 is a graph showing the actual scanline bow versus scan distance for after various amounts of scanline bow adjustment by the mirror mount formed according to the present invention.

FIG. 15 is an example of experimental data for various amounts of bow adjustment by means of the present invention. Referring to FIG. 14, curve A is the parbolic bow from the scanning system before adjustment. The other curves from curve B to curve O are the data after the bow adjustment screw is increasingly rotated. After bow adjustment the crossbar is locked by tightening set screws in holes 214. To cancel and existing bow the wobble correction mirror can be bent in the direction opposite to F in FIG. 8.

Thus the bow can be increased or decreased depending on whether the present bow adjusting means has the role of the fixed and moveable pins are interchanged between the top and bottom faces of the wobble mirror.

The invention of the present application approximately equalizes scanline bow for multiple beams from multiple ROS's with each individual ROS producing a single beam.

The four abutments may be hemispherical or toroidal in shape to help avoid stress on the edge surfaces of the mirror.

The mirror mount 100 and the various elements of the backing plate 104 and the bending device 106 should be made of a material having nearly the same thermal expansion coefficient as the mirror to avoid thermal drift of the mirror orientation and bow adjustment.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A printing system having a plurality of raster output scanning systems, comprising:

associated mirror mounts corresponding to a mirror in each raster output scanner for adjusting the curvature of said mirror, each mirror mount having guideplates and a backing plate located behind the rear surface of said mirror, said backing plate having two fixed abutments for contacting the upper horizontal surface of said mirror, each mirror mount having a bending device connected to said backing plate, said bending device having two moveable abutments for contacting the lower horizontal surface of said mirror, and an adjuster including a crossbar for moving said two moveable abutments to move said mirror vertically and adjust the curvature of said mirror for each raster output scanner thereby adjusting the scanline bow of the optical scanning system, and the guideplates confining the crossbar to a plane that is parallel to the backing plate and to an optical face of the mirror.

2. The printing system having a plurality of raster output scanning systems according to claim 1 wherein each mirror mount for a mirror for adjusting the curvature of a mirror further comprises:

said adjuster including include a setting screw through a portion of said backing plate to said bending device.

3. The printing system having a plurality of raster output scanning systems according to claim 1 wherein each mirror mount for a mirror for adjusting the curvature of a mirror further comprises:

said two fixed abutments are located farther from the vertical axis of said mirror than said two moveable abutments.

4. The printing system having a plurality of raster output scanning systems according to claim 1 wherein each mirror mount for a mirror for adjusting the curvature of a mirror further comprises:

said scanline bows of multiple beams from multiple optical scanning systems are adjusted to approximately equalize said scanline bows.

5. The printing system having a plurality of raster output scanning systems according to claim 1 wherein each mirror mount for a mirror for adjusting the curvature of a mirror further comprises:

said mirror is a wobble correction mirror with cylindrical power in a cross scan direction.

6. The printing system having a plurality of raster output scanning systems according to claim 5 wherein each mirror mount for a mirror for adjusting the curvature of a mirror further comprises:

said adjuster deforms said wobble correction mirror in the direction that is parallel to the face of the mirror and in the cross scan direction.

7. The printing system having a plurality of raster output scanning systems according to claim 6 wherein each mirror mount for a mirror for adjusting the curvature of a mirror further comprises:

said bending device consisting of said backing plate, end caps, a yoke with two pins, two yoke guides, an adjustment screw, an adjustment screw support, the two fixed abutments being two fixed end pins, and set screws for locking the yoke.

8. The printing system having a plurality of raster output scanning systems according to claim 7 wherein each mirror mount for a mirror for adjusting the curvature of a mirror further comprises:

tightening of said adjustment screw deforms said wobble correction mirror so that optical axis is a parabola, and this deformation of the optical axis causes a parabolic bow that is proportional to a movement of said adjustment screw whereby reflection of an incident laser beam from said wobble mirror the laser beam is differentially rotated through a small angle due to a bow adjustment wherein an amount of differential rotation versus distance along said mirror is a parabola and the proportionality constant of bow adjustment per unit rotation of said adjustment screw depends on curvature of said cylindrical mirror and pitch of said adjustment screw.

9. The printing system having a plurality of raster output scanning systems according to claim 8 wherein each mirror mount for a mirror for adjusting the curvature of a mirror further comprises:

orienting said yoke to adjust upward or downward the bow at a photoreceptor plane can be respectively decreased or increased, depending on whether the bow of the incident scanning beam is above or below the original optical axis of said bow correction mirror before deformation.

10. The printing system having a plurality of raster output scanning systems according to claim 9 wherein each mirror mount for a mirror for adjusting the curvature of a mirror further comprises:

the two moveable abutments being hemispherical rings on said pins of said yokes and move an applied force on said mirror away from the optical face of said wobble mirror so that the cylindrical focus of said wobble mirror is no longer altered by the bow correction adjustment.

11. The printing system having a plurality of raster output scanning systems according to claim 10 wherein each mirror mount for a mirror for adjusting the curvature of a mirror further comprises:

said fixed end pins on said backing plate are located far enough from a clear aperture of said wobble correction mirror so that the cylindrical focus of said wobble mirror is not change by local mechanical deformation of said wobble mirror due to the forces on said wobble mirror by said fixed end pins.

12. The printing system having a plurality of raster output scanning systems according to claim 11 wherein set screws are used to lock said yoke in place after bow adjustment has been made.

13. A printing system having a plurality of raster output scanning systems, comprising:

associated mirror mounts corresponding to a mirror in each raster output scanner for adjusting the curvature of said mirror, each mirror mount having guideplates and a backing plate located behind the rear surface of said mirror, said backing plate having two fixed abutments for contacting the upper horizontal surface of said mirror, each mirror mount having a bending device connected to said backing plate, said bending device having two moveable abutments for contacting the lower horizontal surface of said mirror, and an adjuster including a crossbar for moving said two moveable abutments to move said mirror vertically and adjust the curvature of said mirror for each raster output scanner thereby adjusting the scanline bow of the optical scanning system;

said adjuster including a setting screw through a portion of said backing plate to said bending device and said two fixed abutments are located farther from the vertical axis of said mirror than said two moveable abutments wherein said bending device extends along a central portion of said rear surface of said mirror;

said scanline bows of multiple beams from multiple optical scanning systems are adjusted to approximately equalize said scanline bows;

the guideplates confining the crossbar to a plane that is parallel to the backing plate and to an optical face of the mirror; and said mirror is a wobble correction mirror with cylindrical power in a cross scan direction.

14. The printing system having a plurality of raster output scanning systems according to claim 13 wherein each mirror mount for a mirror for adjusting the curvature of a mirror further comprises:

said adjustment means deforms said wobble correction mirror in the direction that is parallel to the face of the mirror and in the cross scan direction.

15. The printing system having a plurality of raster output scanning systems according to claim 14 wherein each mirror mount for a mirror for adjusting the curvature of a mirror further comprises:

said bending device consisting of said backing plate, end caps, a yoke with two pins, two yoke guides, an adjustment screw, an adjustment screw support, the two fixed abutments being two fixed end pins, and set screws for locking the yoke.

16. The printing system having a plurality of raster output scanning systems according to claim 15 wherein each mirror mount for a mirror for adjusting the curvature of a mirror further comprises:

tightening of said adjustment screw deforms said wobble correction mirror so that optical axis is a parabola, and this deformation of the optical axis causes a parabolic bow that is proportional to a movement of said adjustment screw whereby reflection of an incident laser beam from said wobble mirror the laser beam is differentially rotated through a small angle due to a bow adjustment wherein an amount of differential rotation versus distance along said mirror is a parabola and the proportionality constant of bow adjustment per unit rotation of said adjustment screw depends on curvature of said cylindrical mirror and pitch of said adjustment screw.

17. The printing system having a plurality of raster output scanning systems according to claim 16 wherein each mirror mount for a mirror for adjusting the curvature of a mirror further comprises:

orienting said yoke to adjust upward or downward the bow at the photoreceptor plane can be respectively decreased or increased, depending on whether the bow of the incident scanning beam is above or below the original optical axis of said bow correction mirror before deformation.

18. The printing system having a plurality of raster output scanning systems according to claim 17 wherein each mirror mount for a mirror for adjusting the curvature of a mirror further comprises:

the two moveable abutments being hemispherical rings on said pins of said yokes move an applied force on said mirror away from the optical face of said wobble mirror so that the cylindrical focus of said wobble mirror is no longer altered by the bow correction adjustment.

19. The printing system having a plurality of raster output scanning systems according to claim 18 wherein each mirror mount for a mirror for adjusting the curvature of a mirror further comprises:

said fixed end pins on said backing plate are located far enough from a clear aperture of said wobble correction mirror so that the cylindrical focus of said wobble mirror is not change by local mechanical deformation of said wobble mirror due to the forces on said wobble mirror by said fixed end pins.

20. A printing system having a plurality of raster output scanning systems, comprising:

associated mirror mounts corresponding to a mirror in each raster output scanner for adjusting the curvature of said mirror, each mirror mount having guideplates and a backing plate located behind the rear surface of said mirror, said backing plate having two fixed abutments for contacting the upper horizontal surface of said mirror, each mirror mount having a bending device connected to said backing plate, said bending device having two moveable abutments for contacting the lower horizontal surface of said mirror, and an adjuster including a crossbar for moving said two moveable abutments to move said mirror vertically and adjust the curvature of said mirror for each raster output scanner thereby adjusting the scanline bow of the optical scanning system;

said adjuster including a setting screw through a portion of said backing plate to said bending device and said two fixed abutments are located farther from the vertical axis of said mirror than said two moveable abutments wherein said bending device extends along a central portion of said rear surface of said mirror;

said scanline bows of multiple beams from multiple optical scanning systems are adjusted to approximately equalize said scanline bows;

the guideplates confining the crossbar to a plane that is parallel to the backing plate and to an optical face of the mirror; and said mirror is a wobble correction mirror with cylindrical power in a cross scan direction wherein set screws are used to lock a yoke in place after bow adjustment has been made.

* * * * *